United States Patent
Wang et al.

(10) Patent No.: US 12,205,025 B2
(45) Date of Patent: Jan. 21, 2025

(54) PROCESSOR MEMORY OPTIMIZATION METHOD AND APPARATUS FOR DEEP LEARNING TRAINING TASKS

(71) Applicant: Beijing Baidu Netcom Science Technology Co., Ltd., Beijing (CN)

(72) Inventors: Haifeng Wang, Beijing (CN); Xiaoguang Hu, Beijing (CN); Dianhai Yu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 974 days.

(21) Appl. No.: 17/211,146

(22) Filed: Mar. 24, 2021

(65) Prior Publication Data
US 2021/0209471 A1    Jul. 8, 2021

Related U.S. Application Data

(63) Continuation of application No. PCT/CN2020/095152, filed on Jun. 9, 2020.

(30) Foreign Application Priority Data

Oct. 18, 2019   (CN) .......................... 201910996309.3

(51) Int. Cl.
*G06N 3/08* (2023.01)
*G06F 7/76* (2006.01)
*G06F 13/16* (2006.01)
*G06N 3/063* (2023.01)

(52) U.S. Cl.
CPC ............... *G06N 3/08* (2013.01); *G06F 7/768* (2013.01); *G06F 13/1657* (2013.01); *G06N 3/063* (2013.01)

(58) Field of Classification Search
None
See application file for complete search history.

(56) References Cited

U.S. PATENT DOCUMENTS

| | | | |
|---|---|---|---|
| 10,839,286 B2 * | 11/2020 | Fraser | G06N 3/084 |
| 11,288,513 B1 * | 3/2022 | Desai | G06F 3/167 |
| 2016/0071023 A1 * | 3/2016 | Eicher | G06N 5/025 |
| | | | 706/12 |
| 2017/0220949 A1 * | 8/2017 | Feng | H04L 41/16 |

(Continued)

OTHER PUBLICATIONS

Le Tung D. et al., TFLMS: Large Model Support in TensorFlow by Graph Rewriting. Oct. 2, 2019, arXiv, 10 pages. (Year: 2019).*

(Continued)

*Primary Examiner* — Eric Coleman
(74) *Attorney, Agent, or Firm* — Harness, Dickey & Pierce, P.L.C.

(57) ABSTRACT

The present application discloses a processor video memory optimization method and apparatus for deep learning training tasks, and relates to the technical field of artificial intelligence. In the method, by determining an optimal path for transferring a computing result, the computing result of a first computing unit is transferred to a second computing unit by using the optimal path. Thus, occupying the video memory is avoided, and meanwhile, a problem of low utilization rate of the computing unit of a GPU caused by video memory swaps is avoided, so that training speed of most tasks is hardly reduced.

13 Claims, 3 Drawing Sheets

```
                                                    101
┌──────────────────────────────────────────────────────────┐
│ A first processor receives a request instruction input by a user, where the request instruction is │
│           configured to request training of a deep learning model                                  │
└──────────────────────────────────────────────────────────┘
                                                    102
┌──────────────────────────────────────────────────────────┐
│ The first processor determines a path through which a computing result of a first computing      │
│ unit is transferred to a second computing unit, where the first computing unit and the second    │
│ computing unit are included in the first processor, and at least one intermediate computing unit │
│        exists between the first computing unit and the second computing unit                      │
└──────────────────────────────────────────────────────────┘
                                                    103
┌──────────────────────────────────────────────────────────┐
│ The first processor transfers the computing result of the first computing unit to the second    │
│                    computing unit through the optimal path                                        │
└──────────────────────────────────────────────────────────┘
```

(56) References Cited

U.S. PATENT DOCUMENTS

| | | | | |
|---|---|---|---|---|
| 2019/0087472 A1* | 3/2019 | Dong | ................. | G06F 16/3334 |
| 2019/0102684 A1* | 4/2019 | Beran | ................ | G05B 23/0294 |
| 2019/0370602 A1* | 12/2019 | Haneda | .................... | G06N 3/08 |
| 2020/0174840 A1* | 6/2020 | Zhao | .................... | G06F 9/5011 |
| 2020/0292340 A1* | 9/2020 | Li | ..................... | G01C 21/3469 |

OTHER PUBLICATIONS

Zhang, J. et al., Efficient Memory Management for GPU-based Deep Learning Systems,, 2019, arXiv, 13 pages. (Year: 2019).*

First Office Action from corresponding Japanese Application No. 2021-516427 dated Apr. 13, 2022. (10 pages).

Extended European Search Report from EP Application No. 20864303. 1-1203 / 3869417 PCT/CN2020095152 dated Jun. 24, 2022. (10 pages).

Junzhe Zhang et al: "Efficient Memory Management for GPU-based Deep Learing Systems," arxiv.org, Cornell University Library, Feb. 19, 2019. (13 pages).

"Development of a large-scale deep learning library using a memory hierarchy of a GPU computer." ooc_cuDNN:GPU computers, Research Report of Information Processing Engineers, Low Performance Computing (HPC) 2017—HPC-2 160 [online], Japan, Information Processing Society, Jan. 19, 2017, (11 pages).

"Consideration of the method of learing a large-scale neural network by TensorFlow" and a thirty sixth meeting of the Japan Society of the Japan Society of Japan, vol. 2018., No. 8, No. 27, (Search Date: Apr. 13, 2022], Internet, URL: http://jssst.or.jp/files/user/taikai/2019/GENERAL/general2-1.pdf. (10 pages).

* cited by examiner

PROCESSOR MEMORY OPTIMIZATION METHOD AND APPARATUS FOR DEEP LEARNING TRAINING TASKS

CROSS-REFERENCE TO RELATED APPLICATIONS

This application is a continuation of International Application No. PCT/CN2020/095152, filed on Jun. 9, 2020, which claims priority to Chinese Patent Application No. 2019109963093, filed with the China National Intellectual Property Administration on Oct. 18, 2019 and titled "PROCESSOR MEMORY OPTIMIZATION METHOD AND APPARATUS FOR DEEP LEARNING TRAINING TASKS". The disclosures of the aforementioned applications are hereby incorporated by reference in their entireties.

TECHNICAL FIELD

Embodiments of the present application relate to the field of deep learning technologies, and in particular, to a processor memory optimization method and apparatus for deep learning training tasks.

BACKGROUND

Currently, deep learning (Deep Learning) is a new field in machine learning research, and the motivation thereof is to establish a neural network simulating human brain for analyzing and learning, so as to interpret data, such as images, sounds and text, by simulating the mechanism of human brain. Typical applications of deep learning include image recognition, voice recognition, and the like. During the application, a deep learning model, such as a face recognition model and a voice recognition model, needs to be trained.

Typically, a processor, such as a graphics processing unit (Graphics Processing Unit, GPU), is used to train the deep learning model. The GPU has a plurality of computing units, a small quantity of control units and storage units. In order to sufficiently improve the utilization rate of the computing units of the GPU, the quantity of tasks per training needs to be increased. The quantity of tasks refers to the quantity of computations, such as addition, subtraction, multiplication, division, integral, performed by the computing units on training samples. Obviously, the greater the quantity of the training samples loaded to a GPU video memory each time, the greater the quantity of tasks. The quantity of the training samples loaded to the GPU video memory each time may also be referred to as batch size.

However, size of the GPU video memory is limited, that is, the quantity of the storage units of the GPU is limited. If the deep learning model is relatively complex, the GPU video memory is heavily occupied with the increase of the batch size, thus the training of the deep learning model cannot be completed. Therefore, in a training process of the deep learning model, how to optimize the GPU video memory is a problem to be solved urgently.

SUMMARY

Embodiments of the present application provide a processor video memory optimization method and apparatus for deep learning training tasks. By determining an optimal path for transferring a computing result, the computing result of a first computing unit is transferred to a second computing unit by using the optimal path. Thus, occupying a video memory is avoided, and meanwhile, a problem of a low utilization rate of computing units of the GPU caused by video memory swaps is avoided.

According to a first aspect, an embodiment of the present application provides a processor video memory optimization method for deep learning training tasks, including: receiving, by a first processor, a request instruction input by a user, where the request instruction is configured to request training of a deep learning model; determining, by the first processor, an optimal path from a first path and a second path, where in the first path, a computing result of a first computing unit directly reaches a second computing unit from the first computing unit, and in the second path, the computing result of the first computing unit reaches the second computing unit after a swap operation is executed in a memory of a second processor, the first computing unit and the second computing unit are included in the first processor, and at least one intermediate computing unit exists between the first computing unit and the second computing unit; and transferring, by the first processor, the computing result of the first computing unit to the second computing unit through the optimal path. By adopting the solution, the optimal path for transferring the computing result is determined, and the computing result of the first computing unit is transferred to the second computing unit by using the optimal path. Thus, occupying a video memory is avoided, and meanwhile, the problem of the low utilization rate of the computing units of the GPU caused by the video memory swaps is avoided, so that training speed of most tasks is hardly reduced. In addition, in a real training environment, video memory occupancy usually has a peak value along with the numbers of training samples, and usually, only a few samples can reach the peak value. By adopting the solution described in the embodiments of the present application, it is possible to dynamically add the swap operation for only a very small quantity of situations to satisfy requirements of the peak value for the video memory, and training failure caused by storage overflow is avoided. For most non-peak situations, it is not necessary to add the swap operation, and thus, overhead caused by the video memory swaps is avoided, and the training speed is ensured.

In a feasible design, the determining, by the first processor, the optimal path from the first path and the second path includes: determining, by the first processor, state information of a video memory of the first processor; and determining, by the first processor, the optimal path from the first path and the second path according to the state information.

In a feasible design, the state information includes at least one of the following: batch size, length of a training sample, size of video memory space occupied by the computing result, swap speed of the video memory, and size of remaining space of the video memory, where the batch size is configured to indicate size of training samples loaded to the video memory, and the swap speed of the video memory is configured to indicate an amount of data reaching the memory of the second processor from the video memory per unit time.

In a feasible design, the optimal path is the second path, after the determining, by the first processor, the optimal path from the first path and the second path, further include: determining, by the first processor, a third computing unit from the at least one intermediate computing unit, where the third computing unit is a computing unit adjacent to and located before the second computing unit from the at least one intermediate computing unit; and adding, by the first processor, a dependency relationship between the third computing unit and the swap operation of the second processor.

In a feasible design, the swap operation includes a swap-out operation and a swap-in operation, and after adding the dependency relationship between the third computing unit and the swap operation of the second processor, the first processor further executes a computation corresponding to the first computing unit to obtain the computing result, sends the computing result to the second processor to cause the second processor to execute the swap-out operation on the computing result; determines whether the computation corresponding to the third computing unit is finished or not, and if the first processor finishes the computation corresponding to the third computing unit, sends indication information to the second processor to cause the second processor to execute the swap-in operation on the computing result of the first computing unit; and executes the computation corresponding to the second computing unit according to the computing result of the third computing unit and the computing result after the swap-in operation is executed.

In a feasible design, after determining the optimal path from the first path and the second path, the first processor further determines whether the computing result of the first computing unit is transferred to the memory of the second processor or not; and releases space occupied by the computing result of the first computing unit in the video memory, if the computing result of the first computing unit is transferred to the memory of the second processor.

In a feasible design, the first processor is a tensor processing unit TPU or a graphics processing unit GPU.

According to a second aspect, an embodiment of the present application provides a processor video memory optimization apparatus for deep learning training tasks, including:
  a receiving module, configured to receive a request instruction input by a user, where the request instruction is configured to request training of a deep learning model;
  a processing module, configured to determine an optimal path from a first path and a second path, where in the first path, a computing result of a first computing unit directly reaches a second computing unit from the first computing unit, and in the second path, the computing result of the first computing unit reaches the second computing unit after a swap operation is executed in a memory of a second processor, the first computing unit and the second computing unit are included in the first processor, and at least one intermediate computing unit exists between the first computing unit and the second computing unit; and
  a transferring module, configured to transmit the computing result of the first computing unit to the second computing unit through the optimal path.

In a feasible design, the processing module is configured to determine state information of a video memory of the first processor and determine the optimal path from the first path and the second path according to the state information.

In a feasible design, the state information includes at least one of the following: batch size, length of a training sample, size of video memory space occupied by the computing result, swap speed of the video memory, and size of remaining space of the video memory, where the batch size is configured to indicate size of training samples loaded to the video memory, and the swap speed of the video memory is configured to indicate an amount of data reaching the memory of the second processor from the video memory per unit time.

In a feasible design, the optimal path is the second path, and after determining the optimal path from the first path and the second path, the processing module is further configured to determine a third computing unit from the at least one intermediate computing unit, where the third computing unit is a computing unit adjacent to and located before the second computing unit from the at least one intermediate computing unit; and add a dependency relationship between the third computing unit and the swap operation of the second processor.

In a feasible design, the swap operation includes a swap-out operation and a swap-in operation, and after adding the dependency relationship of between the third computing unit and the swap operation of the second processor, the processing module is further configured to execute a computation corresponding to the first computing unit to obtain the computing result; send the computing result to the second processor to enable the second processor to execute the swap-out operation on the computing result; determine whether the computation corresponding to the third computing unit is finished or not, and if the first processor finishes the computation corresponding to the third computing unit, send indication information to the second processor to cause the second processor to execute the swap-in operation on the computing result of the first computing unit; and execute the computation corresponding to the second computing unit according to the computing result of the third computing unit and the computing result after the swap-in operation is executed.

In a feasible design, after determining the optimal path from the first path and the second path, the processing module is further configured to determine whether the computing result of the first computing unit is transferred to the memory of the second processor or not; and release space occupied by the computing result of the first computing unit in the video memory, if the computing result of the first computing unit is transferred to the memory of the second processor.

In a feasible design, the first processor is a tensor processing unit TPU or a graphics processing unit GPU.

According to a third aspect, an embodiment of the present application provides an electronic device, including:
  at least one processor; and
  a memory communicatively coupled to the at least one processor, where the memory stores instructions executable by the at least one processor, and the instructions are executed by the at least one processor to cause the at least one processor to execute the method according to the first aspect or various possible implementations of the first aspect.

According to a fourth aspect, an embodiment of the present application provides a computer program product including instructions, which when run on an electronic device, cause an electronic device to execute the method according to the first aspect or various possible implementations of the first aspect.

According to a fifth aspect, an embodiment of the present application provides a storage medium, and the storage medium stores instructions, which when run on an electronic device, cause an electronic device to execute the method according to the first aspect or various possible implementations of the first aspect.

According to a sixth aspect, an embodiment of the present application provides a processor video memory optimization method for deep learning training tasks, including: determining, by a first processor, a path through which a computing result of a first computing unit is transferred to a second computing unit, the first computing unit and the second computing unit are included in the first processor, and at least one intermediate computing unit exists between the first computing unit and the second computing unit; and sending, by the first processor, the computing result of the first computing unit to the second computing unit through the path.

An embodiment of the above application has the following advantages or beneficial effects. By determining the optimal path for transferring the computing result, the computing result of the first computing unit is transferred to the second computing unit by using the optimal path. Thus, occupying the video memory is avoided, and meanwhile, the problem of the low utilization rate of the computing units of the GPU caused by the video memory swaps is avoided, so that the training speed of most tasks is hardly reduced. In addition, in a real training environment, the video memory occupancy usually has a peak value along with the numbers of training samples, and usually, only a few samples may reach the peak value. By adopting the solution described in the embodiments of the present application, it is possible to dynamically add a swap operation for only a very small quantity of situations to satisfy requirements of the peak value for the video memory, and training failure caused by storage overflow is avoided. For most non-peak situations, it is not necessary to add the swap operation, and thus, overhead caused by the video memory swaps is avoided, and the training speed is ensured.

Other effects of the above alternatives will be described below with reference to specific embodiments.

BRIEF DESCRIPTION OF DRAWINGS

The drawings are included to provide a better understanding of the present solution and do not constitute a limitation to the present application. Where.

DESCRIPTION OF EMBODIMENTS

Illustrative embodiments of the present application are described below in conjunction with accompanying drawings, where various details of the embodiments of the present application are included to assist in understanding, and they should be considered as merely illustrative. Accordingly, persons of ordinary skill in the art should recognize that various changes and modifications may be made to the embodiments described herein without departing from scope and spirit of the present application. Likewise, for clarity and conciseness, description of well-known functions and structures is omitted in the following description.

Currently, a GPU is typically used to train a deep learning model. The GPU has a small quantity of control units and storage units and a large quantity of computing units. The GPU has good concurrency, and the quantity of computing units can reach 5120 or even more. In order to improve the utilization rate of the computing units of the GPU, the quantity of training samples loaded to a GPU video memory each time needs to be increased. The quantity of the training sample loaded to the GPU video memory each time may also be referred to as batch size. However, size of the GPU video memory is limited, thus the batch size cannot be increased without limit, and the deep learning model cannot be trained to obtain.

In view of this, the embodiments of the present application provide a processor video memory optimization method for deep learning training tasks. By determining an optimal path for transferring a computing result, the computing result of a first computing unit is transferred to a second computing unit by using the optimal path. Thus, occupying the video memory is avoided and meanwhile, a problem of low utilization rate of the computing units of the GPU caused by video memory swaps is avoided.

Figure 1:
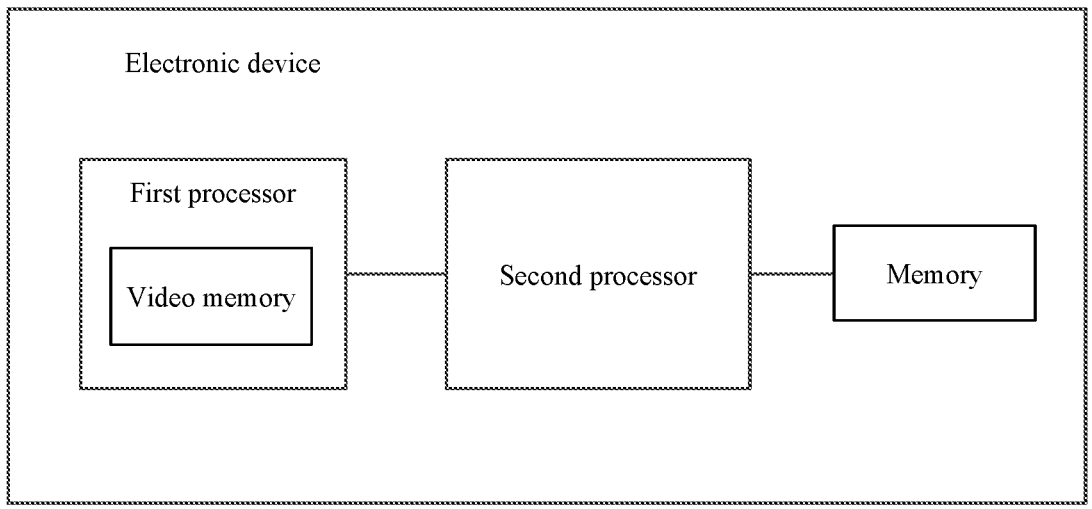
FIG. 1 is a schematic diagram of operating environment of a processor video memory optimization method for deep learning training tasks according to an embodiment of the present application.

FIG. 1 is a schematic diagram of operating environment of a processor video memory optimization method for deep learning training tasks according to an embodiment of the present application. Referring to FIG. 1, an electronic device may be a terminal device or a server. At least two processors are provided on the electronic device, which are respectively a first processor and a second processor. The first processor has a large quantity of computing units and a small quantity of storage units and control units. The second processor is directly connected to a memory device with a relatively large storage space. The memory device may be a random access memory or a solid state drive (Solid State Disk or Solid State Drive, SSD). A storage unit of the first processor is referred to as a video memory of the first processor. The memory device directly connected to the second processor is referred to as a memory of the second processor. The first processor may be a GPU, a tensor processing unit (Tensor Processing Unit, TPU), etc.

In the embodiments of the present application, the first processor is configured to perform training with the training sample to obtain a deep learning model. In the training process, if the second computing unit needs to use the computing result of the first computing unit, the first computing unit outputs the computing result, and the computing result is stored in the video memory of the first processor. The first processor determines a path through which the computing result reaches the second computing unit. For example, the computing result directly reaches the second computing unit from the first computing unit through a first path. For another example, the computing result reaches the second computing unit through a second path based on video memory swaps. If the computing result reaches the second computing unit through video memory swaps, the second processor is configured to swap the data in the video memory to the memory of the second processor through a swap operation and then send the swapped data to the second computing unit. After the data in the video memory is swapped to the memory of the second processor, the first processor may release the video memory occupied by the computing result, thereby realizing optimization of the video memory.

Hereinafter, on the basis of the above-mentioned FIG. 1, the processor video memory optimization method for deep learning training tasks according to the embodiments of the present application is described in detail. For example, reference may be made to FIG. 2.

Figure 2:
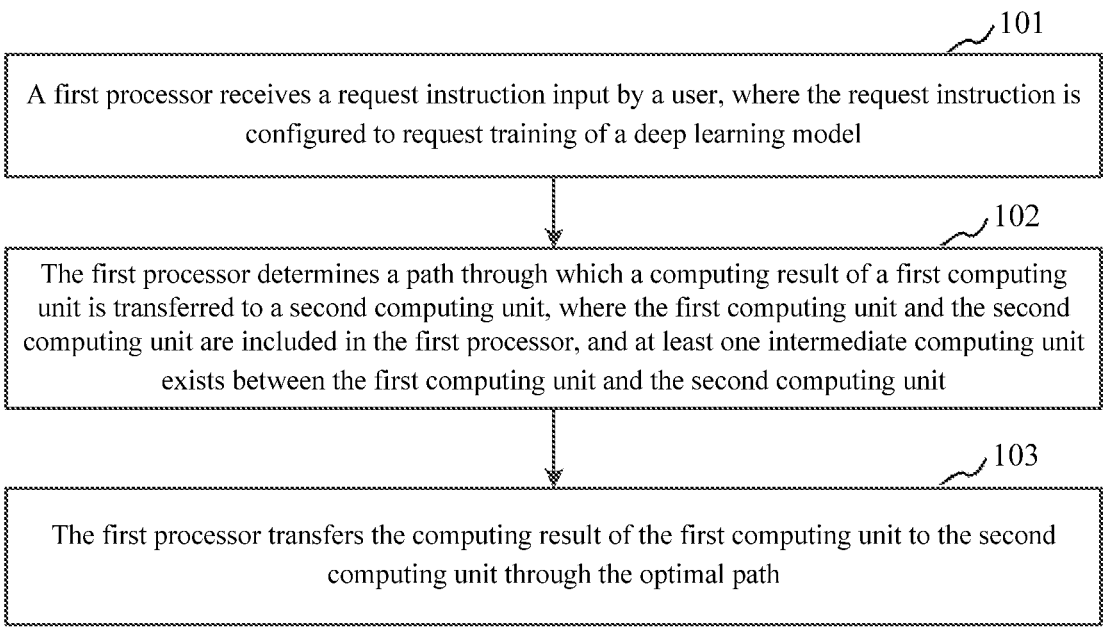
FIG. 2 is a flowchart of a processor video memory optimization method for deep learning training tasks according to an embodiment of the present application.

FIG. 2 is a flowchart of the processor video memory optimization method for deep learning training tasks according to an embodiment of the present application. The present embodiment may include:

Step 101: a first processor receives a request instruction input by a user, where the request instruction is configured to request training of a deep learning model.

Illustratively, when a deep learning model, such as a face recognition model, an image classification model, a voice recognition model, needs to be trained, a user inputs a request instruction to an electronic device through a click operation or a touch operation, etc. A first processor of the electronic device receives and identifies the request instruction for requesting training of the deep learning model.

Step 102: the first processor determines a path through which a computing result of a first computing unit is transferred to a second computing unit, where the first computing unit and the second computing unit are included in the first processor, and at least one intermediate computing unit exists between the first computing unit and the second computing unit.

Illustratively, each computing unit included in the first processor is not independent, but has a dependency relationship with each other. For example, computation of the second computing unit depends on the computing result of the first computing unit. At the same time, there are also a plurality of intermediate computing units between the first computing unit and the second computing unit. After the computing result of the first computing unit is sequentially processed by the plurality of intermediate computing units, the computing result is input to the second computing unit by the last intermediate computing unit (hereinafter referred to as a third computing unit). Since the second computing unit needs to use the computing result of the first computing unit and the computing result of the third computing unit, after the first computing unit obtains the computing result, if the computing result occupies a large amount of video memory, when the computing result is transferred through the first path, that is, the computing result is directly transferred from the first computing unit to the second computing unit, the computing result needs to be stored in the video memory of the first processor constantly, and thus the video memory of the first processor is occupied. For this reason, it is considered to transfer the computing result of the first computing unit to the second computing unit through the second path, that is, through video memory swaps. That is, after the first computing unit obtains the computing result, the computing result is swapped to the memory of the second processor through a swap operation, and then reaches the second computing unit. However, the swap operation needs to swap the computing result from the video memory of the first processor to the memory of the second processor. However, the second processor and the memory are connected through a peripheral component interconnect express (peripheral component interconnect express, PCIE) bus, which has relatively low system bandwidth, and thus copying from the second processor to the memory takes a large amount of time. As a result, although the batch size is increased, the utilization rate of the computing units of the first processor is not improved. In addition, when the second path is adopted, since a large amount of the video memory can be released, training of the deep learning model with large-scale parameters can be implemented.

According to the above, it can be seen that the first path results in that the video memory of the first processor is occupied and the training of the deep learning model with large-scale parameters cannot be implemented, and the second path results in a relatively low utilization rate of the computing units of the first processor. Therefore, in this step, the first processor determines the optimal path from the first path and the second path to minimize the drawbacks. Furthermore, since the training sample input to the first computing unit is constantly changing, the computing result of the first computing unit is dynamically changing. Therefore, the optimal path determined by the first processor is also dynamically changing. For example, assuming that there are 1024 training samples loaded to the video memory of the first processor in a batch, the 1024 training samples include training samples with lengths of 128, 512, etc. Then, for a training sample with a length of 128, since the computing result obtained by the first computing unit through training with the training sample has a relatively small size, a relatively small amount of video memory is occupied. If the computing result is transferred through the second path, the swap time is about to increase, resulting in that the training speed of the deep learning model becomes slower. Therefore, the optimal path determined by the first processor is the first path. For a training sample with a length of 512, since the computing result obtained by the first computing unit through training with the training sample has a relatively large size, a relatively large amount of video memory is occupied. If the computing result is transferred through the first path, the video memory of the first processor may be occupied, resulting in the training failure of the deep learning model. Therefore, the optimal path determined by the first processor is the second path.

Step 103: the first processor transfers the computing result of the first computing unit to the second computing unit through the optimal path.

Illustratively, if the optimal path is the first path, the first processor stores the computing result of the first computing unit in the video memory of the first processor. The first processor does not release the video memory occupied by the computing result until the computing result reaches the second computing unit. If the optimal path is the second path, the first processor sends the computing result of the first computing unit to the second processor to cause the second processor to execute a swap operation on the computing result, such as a swap-in operation and a swap-out operation. When the computing result of the first computing unit reaches the memory of the second processor, that is, after the swap-in operation is executed, the first processor releases the video memory occupied by the computing result.

In the processor video memory optimization method for deep learning training tasks provided by the embodiment of the present application, the first processor determines the optimal path from the first path and the second path after receiving the request instruction for requesting the training of the deep learning model. In the first path, the computing result of the first computing unit directly reaches the second computing unit from the first computing unit, and in the second path, the computing result of the first computing unit reaches the second computing unit through the video memory swaps. Then, the first processor transfers the computing result of the first computing unit to the second computing unit by using the optimal path. By adopting the solution, the optimal path for transferring the computing result is determined, the computing result of the first computing unit is transferred to the second computing unit by using the optimal path, and thus occupying the video memory is avoided and meanwhile, the problem of low utilization rate of the computing units of the GPU caused by the video memory swaps is avoided, so that training speed of most tasks is hardly reduced. In addition, in a real training environment, video memory occupancy usually has a peak value along with the numbers of training samples, and usually, only a few samples can reach the peak value. By adopting the solution described in the embodiments of the present application, it is possible to dynamically add the swap operation only for a very small quantity of situations to satisfy requirements of the peak value for the video memory, and training failure caused by storage overflow is avoided. For most non-peak situations, it is not necessary to add the swap operation, and thus, overhead caused by the video memory swaps is avoided, and the training speed is ensured.

Hereinafter, how the first processor determines the optimal path in the above embodiment will be described in detail.

In a feasible implementation, when the first processor determines the optimal path from the first path and the second path, the first processor determines state information of the video memory of the first processor, and determines the optimal path from the first path and the second path according to the state information.

Illustratively, the state information of the video memory of the first processor is configured to indicate a state of the video memory of the first processor. The first processor may determine a path for transferring the computing result of the first computing unit according to the state information of the video memory. For example, if the state information indicates that available video memory is relatively large, then the computing result is transferred through the first path, so as to avoid the problem that the training speed of the deep learning model becomes slow due to too long time spent by the swap operation in video memory swaps. For another example, when the computing result of the first computing unit has a relatively large size, if the computing result is transferred through the first path, the problem of constant occupancy of the video memory will be caused, and therefore, the optimal path determined by the first processor is the second path.

By adopting this solution, the purpose of determining the optimal path by the first processor according to the state information of the video memory is achieved.

In the above embodiment, optionally, the state information includes at least one of the following: batch size, length of a training sample, size of video memory space occupied by the computing result, swap speed of the video memory, and size of remaining space of the video memory, where the batch size is configured to indicate size of training samples loaded to the video memory, and the swap speed of the video memory is configured to indicate an amount of data reaching the memory of the second processor from the video memory per unit time.

Figure 3:
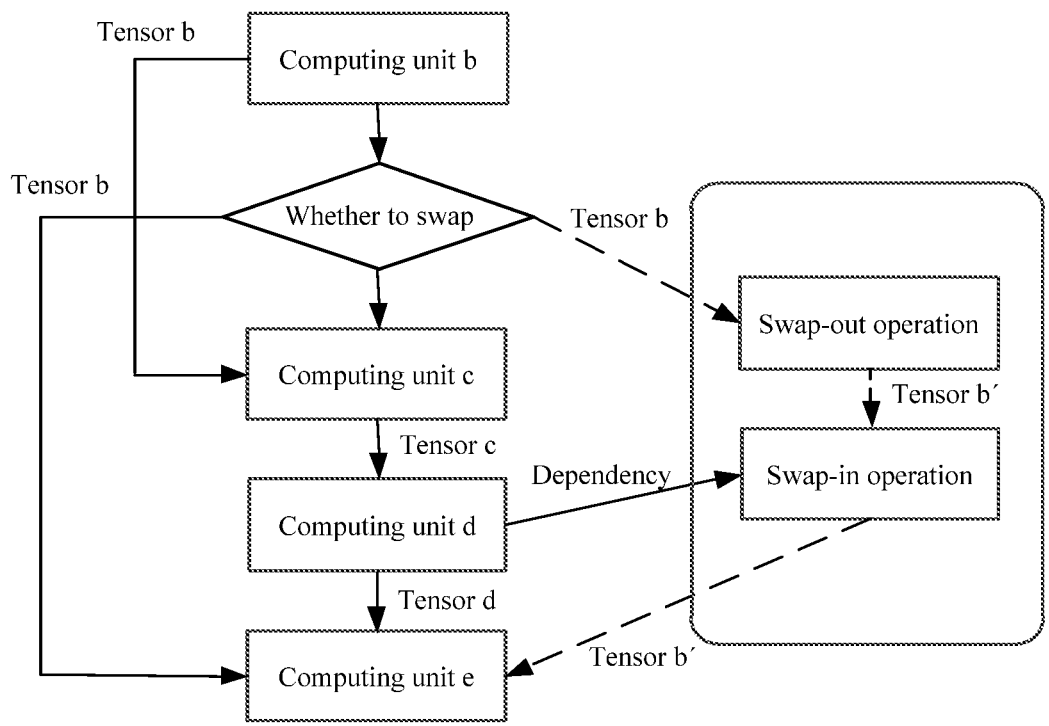
FIG. 3 is an illustrative schematic diagram of a processor video memory optimization method for deep learning training tasks according to an embodiment of the present application.

Illustratively, the first processor may determine a path for transferring the computing result of the first computing unit to the second computing unit according to current state information of the video memory. Hereinafter, some implementation examples are illustrated. Referring to FIG. 3, FIG. 3 is an illustrative schematic diagram of the processor video memory optimization method for deep learning training tasks according to an embodiment of the present application.

Referring to FIG. 3, the computing units included in the first processor include a computing unit b, a computing unit c, a computing unit d and a computing unit e. A computing result (tensor b) of the computing unit b is used by the computing unit c and the computing unit e. The computing unit c and the computing unit d are intermediate computing units between the computing unit b and the computing unit e. The first computing unit is the computing unit b, the second computing unit is the computing unit e, and the third computing unit is the computing unit d.

Referring to FIG. 3, after the first processor executes the computation corresponding to the computing unit b, the computation result, namely the tensor b, is generated. Since the computing unit c is directly connected to the computing unit b, the computing result is directly transferred to the computing unit c. An intermediate computing unit exists between the computing unit b and the computing unit e, that is, the computing unit e can use the tensor b and tensor d only after obtaining the computing result tensor d of computing unit d. In this process, the computing unit e needs to wait for the first processor to execute the corresponding computations of the computing unit c and the computing unit d. In this case, the first processor may determine whether to store the tensor b in the video memory through the first path until the tensor b is utilized, or to swap the tensor b to the memory of the second processor through the second path, through the following manners.

In a first manner, the first processor determines the optimal path from the first path and the second path according to the size of the tensor b.

Illustratively, the size of the tensor b indicates the size of the video memory space occupied by the tensor b. If the size of the tensor b is less than a specific threshold, such as 100 KB, the first processor determines that the optimal path is the first path. Otherwise, the first processor determines that the optimal path is the second path. The reason why the first path is taken when the size of the tensor b is less than the threshold is that, when the size of the tensor b is relatively small, the video memory space that can be saved is limited, but time is wasted if the swap operation is executed. In this process, the threshold may be obtained by counting in advance the time taken when the tensor b of different sizes invokes the swap operation.

In a second manner, the first processor determines the optimal path from the first path and the second path according to the swap speed of the video memory.

Illustratively, if the second path is adopted, the process by which the computing result of the first computing unit reaches the memory of the first processor from the video memory is referred to as a swap-out operation. After that, the process by which the computing result reaches the video memory of the second processor from the memory of the first processor is referred to as a swap-in operation. During the training process of the deep learning model, there may be other storage swap operations. When the optimal path is determined in the second manner, the tensor b may be transferred through the first path by default. Some training samples may be selected for actual testing. Duration of the swap-in operation and duration of the swap-out operation are obtained according to actual test results. The swap speed of the video memory is determined according to the duration of the swap-in operation and the duration of the swap-out operation. The swap speed of the video memory is a ratio of size of a tensor to swap time. If the swap speed of the video memory is less than a certain threshold, the first path is taken as the optimal path. If the swap speed of the video memory is greater than the certain threshold, the second path is taken as the optimal path.

In a third manner, the first processor determines the optimal path from the first path and the second path according to the size of the training sample.

Illustratively, the size of the training sample may also be referred to as the length of the training sample. The requirements on the first processor in the training of the deep learning model is generally related to the size of the training sample. If size of a current training sample is less than a specific threshold, the first path is taken as the optimal path. If the size of the current training sample is larger than the specific threshold, the second path is taken as the optimal path.

In a fourth manner, the first processor compares the size of the video memory that can be saved by the swap operation of different tensors b, and determines the optimal path from the first path and the second path.

Illustratively, the first processor selects training samples of different lengths to take the first path and the second path respectively, and counts the size of the video memory that can be saved by the swap operation of tensor b of each training sample, and then, sets a threshold according to the size of the video memory that can be saved. When the size of the saved video memory exceeds the set threshold, the second path is taken as the optimal path. When the size of the saved video memory does not exceed the set threshold, the first path is taken as the optimal path.

In a fifth manner, the first processor compares the size of the video memory that can be saved by the swap operation of different tensors b and the increased swap time. According to the size of the saved video memory and the increased swap time, the size of the video memory saved per unit time is determined, and then the optimal path is determined from the first path and the second path according to the size of the video memory saved per unit time, where the size of the video memory saved per unit time is equal to a ratio of the size of the video memory that can be saved by executing the swap operation on tensor b to the increased swap time.

In a sixth manner, the first processor determines the optimal path from the first path and the second path according to the size of remaining space of the video memory.

Illustratively, the first processor estimates the current video memory occupancy situation according to the length of a current input sample and the result of advanced statistics. Based on the size of the current available video memory, the first processor selects a tensor that saves a large amount of the video memory per unit time to execute the swap operation. When the saved video memory occupancy meets the size of the current available video memory, the first path is taken as the optimal path for the remaining tensors.

By adopting the solution described in this embodiment, the purpose of flexibly determining the optimal path according to the state information of the video memory is achieved.

Referring to FIG. 3 again, when the optimal path is the first path, the tensor b is transferred to the second computing unit, that is the computing unit e, through the path shown by the thick black solid line, that is the first path. When the optimal path is the second path, the tenor b is transferred to the second computing unit through the path shown by the dashed line, that is, the second path. The difference between tensor b' and the tensor b in the figure is that the tensor b is stored in the video memory of the first processor, and the tensor b' is stored in the memory of the second processor. In addition, tensor c in the figure refers to a computing result of the computing unit c, and tensor d refers to a computing result of the computing unit d.

In the foregoing embodiment, in order to prevent the tensor b' from being prematurely executed with the swap-in operation to reach the computing unit e, in the embodiment of the present application, when the optimal path is the second path, after the first processor determines the optimal path from the first path and the second path, a third computing unit is further determined from at least one intermediate computing unit, where the third computing unit is a computing unit adjacent to and located before the second computing unit. The first processor adds the dependency relationship between the third computing unit and the swap operation of the second processor.

Illustratively, referring to FIG. 3 again, the second processor is configured to execute the swap operation, which includes a swap-out operation and a swap-in operation. The second processor can execute the computation corresponding to the computing unit e only after obtaining the computing result of the computing unit d. In order to prevent the second processor from executing the swap-in operation of the swap operation prematurely, the dependency between the computing unit d and the swap-in operation is added, so that the swap-in operation starts after the computation corresponding to the computing unit d is executed.

In this embodiment, by adding the dependency relationship between the third computing unit and the swap operation, the video memory occupancy caused by premature execution of the swap operation is avoided.

Hereinafter, how the first processor executes the training of the deep learning model after the dependency relationship is added in the above embodiment will be described in detail.

In a feasible implementation, after the first processor adds the dependency relationship between the third computing unit and the swap operation of the second processor, the first processor further executes a computation corresponding to the first computing unit to obtain the computing result, and sends the computing result to the second processor to cause the second processor to execute the swap-out operation on the computing result. After that, the first processor determines whether the computation corresponding to the third computing unit is finished or not, and if the first processor finishes the computation corresponding to the third computing unit, the first processor sends indication information to the second processor to cause the second processor to execute the swap-in operation on the computing result of the first computing unit. The first processor executes the computation corresponding to the second computing unit, according to the computing result of the third computing unit, and the computing result after the swap-in operation is executed.

Illustratively, referring to FIG. 3 again, after adding the dependency relationship between the computing unit d and the swap-in operation, during the training process of the deep learning model, the first processor sequentially executes the computations corresponding to the computing unit b, the computing unit c, the computing unit d, and the computing unit e. After the first processor executes the computation corresponding to the computing unit b and obtains the tensor b, the tensor b is sent to the second processor, so that the second processor executes the swap-out operation on the computing result and thus moves the tensor b to the memory of the second processor from the video memory of the first processor to get the tensor b'. After that, the first processor executes the corresponding computation of the computing unit c according to the tensor b to obtain tensor c. Then the first processor executes the computation corresponding to the computing unit d according to the tensor c to obtain tensor d. After determining that the computation corresponding to the computing unit d is completed, the first processor sends indication information to the second processor, where the indication information is configured to indicate the second processor to execute a swap-in operation on the tensor b'. Finally, the first processor uses tensor d and tensor b' as inputs to execute the computation corresponding to the computing unit e.

In the present embodiment, by adding the dependency relationship between the third computing unit and the swap operation, the video memory occupancy caused by premature execution of the swap operation is avoided.

In the foregoing embodiment, after the first processor determines the optimal path from the first path and the second path, the first processor further determines whether the computing result of the first computing unit is transferred to the memory of the second processor or not. If the computing result of the first computing unit is transferred to the memory of the second processor, the first processor releases space occupied by the computing result of the first computing unit in the video memory.

Illustratively, referring to FIG. 3 again, in the case that the optimal path is the second path, after the first processor obtains the tensor b, if the tensor b is successfully transferred to the computing unit c and transferred to the memory of the second processor through the swap-out operation, the space of the video memory occupied by the tensor b is released.

In the present embodiment, after the swap-out operation has been executed on the computing result, the video memory occupied by the computing result is released in time. The problem that the training speed is low or the training cannot to be performed caused by the video memory occupancy is avoided.

The foregoing describes specific implementations of the processor video memory optimization method for deep learning training tasks mentioned in the embodiments of the present application. The following are apparatus embodiments of the present application. The apparatus may be configured to execute the method embodiments of the present application. For details not disclosed in the apparatus embodiments of the present application, please refer to the method embodiments of the present application.

Figure 4:
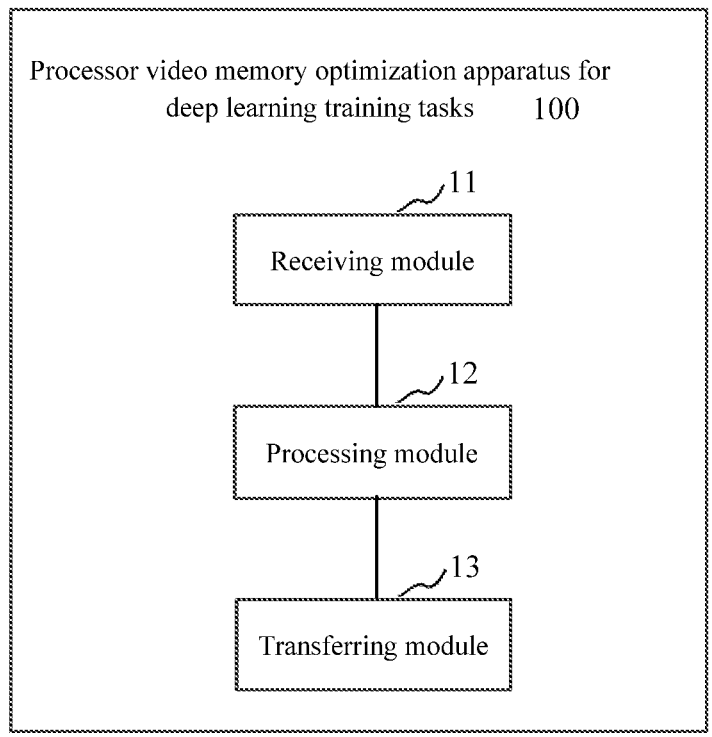
FIG. 4 is a schematic structural diagram of a processor video memory optimization apparatus for deep learning training tasks according to an embodiment of the present application.

FIG. 4 is a schematic structural diagram of a processor video memory optimization apparatus for deep learning training tasks according to an embodiment of the present application. The apparatus may be integrated in an electronic device or implemented by an electronic device, and the electronic device may be a terminal device or a server. As shown in FIG. 4, in the present embodiment, the processor video memory optimization apparatus for deep learning training tasks 100 may include:

a receiving module 11, configured to receive a request instruction input by a user, where the request instruction is configured to request training of a deep learning model;

a processing module 12, configured to determine an optimal path from a first path and a second path, where in the first path, a computing result of a first computing unit directly reaches a second computing unit from the first computing unit, and in the second path, the computing result of the first computing unit reaches the second computing unit after a swap operation is executed in a memory of a second processor, the first computing unit and the second computing unit are included in the first processor, and at least one intermediate computing unit exists between the first computing unit and the second computing unit; and a transferring module 13, configured to transfer the computing result of the first computing unit to the second computing unit through the optimal path.

In a feasible design, the processing module 12 is configured to determine state information of a video memory of the first processor and determine the optimal path from the first path and the second path according to the state information.

In a feasible design, the state information includes at least one of the following:

batch size, length of a training sample, size of video memory space occupied by the computing result, swap speed of the video memory, and size of remaining space of the video memory, where the batch size is configured to indicate size of the training sample loaded to the video memory, and the swap speed of the video memory is configured to indicate an amount of data reaching the memory of the second processor from the video memory per unit time.

In a feasible design, where the optimal path is the second path, after determining the optimal path from the first path and the second path, the processing module 12 is further configured to determine a third computing unit from the at least one intermediate computing unit, where the third computing unit is a computing unit adjacent to and located before the second computing unit from the at least one intermediate computing unit; and add a dependency relationship between the third computing unit and the swap operation of the second processor.

In a feasible design, the swap operation includes a swap-out operation and a swap-in operation, and after adding the dependency relationship of between the third computing unit and the swap operation of the second processor, the processing module 12 is further configured to execute a computation corresponding to the first computing unit to obtain the computing result; send the computing result to the second processor to cause the second processor to execute the swap-out operation on the computing result; determine whether a computation corresponding to the third computing unit is finished or not, and if the first processor finishes the computation corresponding to the third computing unit, send indication information to the second processor to cause the second processor to execute the swap-in operation on the computing result of the first computing unit; and execute the computation corresponding to the second computing unit, according to the computing result of the third computing unit, and the computing result after the swap-in operation is executed.

In a feasible design, after determining the optimal path from the first path and the second path, the processing module 12 is further configured to determine whether the computing result of the first computing unit is transferred to the memory of the second processor or not; and release space occupied by the computing result of the first computing unit in the video memory, if the computing result of the first computing unit is transferred to the memory of the second processor.

In a feasible design, the first processor is a tensor processing unit TPU or a graphics processing unit GPU.

The apparatus provided by the embodiments of the present application may be used in the method executed by the first processor in the above embodiments. The implementation principle and technical effects thereof are similar, and are not described herein again.

According to an embodiment of the present application, the present application also provides an electronic device and a readable storage medium.

Figure 5:
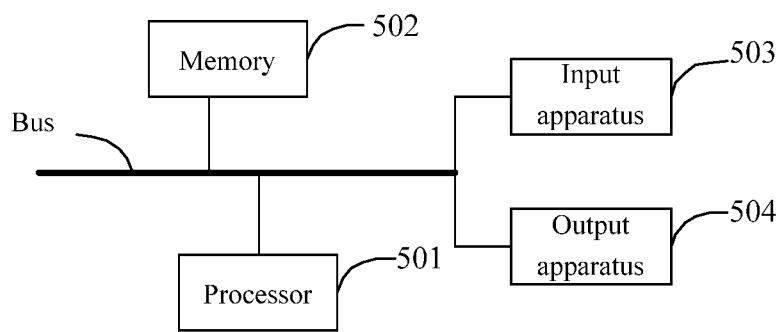
FIG. 5 is a block diagram of an electronic device for implementing a processor video memory optimization method for deep learning training tasks according to an embodiment of the present application.

FIG. 5 is a block diagram of an electronic device for implementing a processor video memory optimization method for deep learning training tasks according to an embodiment of the present application. The electronic device is intended to represent various forms of digital computers, such as laptops, desktops, workstations, personal digital assistants, servers, blade servers, mainframes, and other appropriate computers. The electronic device may also represent various forms of mobile devices, such as personal digital processors, cellular telephones, smart phones, wearable devices, and other similar computing devices. The components shown herein, their connections and relationships, and their functions are merely illustrative, and are not intended to limit implementations of the present application described and/or claimed herein.

As shown in FIG. 5, the electronic device may include: one or more processors 501, a memory 502, and interfaces for connecting various components, which include a high speed interface and a low speed interface. The various components are interconnected using different buses and may be mounted on a common motherboard or in other manners as desired. The processor may process instructions executed within the electronic device, including instructions stored in the memory or on the memory for displaying graphical information of a GUI on an external input/output apparatus (such as a display device coupled to the interface). In other embodiments, multiple processors and/or multiple buses may be used, along with multiple memories and multiple memories, if desired. Also, multiple electronic devices may be connected, with each electronic device providing some necessary operations (e.g. as a server array, a group of blade servers, or a multi-processor system). The processor 501 is taken as an example in FIG. 5.

The memory 502 is a non-transitory computer readable storage medium as provided herein. The memory stores instructions executable by at least one processor to cause at least one processor to execute a processor memory optimization method for deep learning training tasks provided herein. The non-transitory computer-readable storage medium of the present application stores computer instructions, and the computer instructions are configured to cause a computer to execute the processor memory optimization method for deep learning training tasks provided by the present application.

The memory 502, as the non-transitory computer-readable storage medium, may be configured to store non-transitory software programs, non-transitory computer-executable programs and modules, such as program instructions or modules (e.g., a receiving module 11, a processing module 12 and a transferring module 13 shown in FIG. 4) corresponding to the processor memory optimization method for deep learning training tasks in the embodiments of the present application. The processor 501 executes various functions of the server and data processing by running non-transitory software programs, instructions, and modules stored in the memory 502, i.e. implementing the processor video memory optimization method for deep learning training tasks in the above method embodiments.

The memory 502 may include a program storage area and a data storage area. The program storage area may store an operating system, an application program required for at least one function. The data storage area may store data created by the electronic device for executing the processor video memory optimization method for deep learning training tasks, and the like. Further, the memory 502 may include a high speed random access memory, and may also include a non-transitory memory, such as at least one magnetic disk storage device, flash memory device, or other non-transitory solid state storage device. In some embodiments, the memory 502 optionally includes a memory located remotely from the processor 501, which may be connected to the electronic device via a network. Examples of such networks include, but are not limited to, the internet, intranets, local area networks, mobile communication networks, and their combinations.

The electronic device for implementing the processor video memory optimization method for deep learning training tasks may also include an input apparatus 503 and an output apparatus 504. The processor 501, the memory 502, the input apparatus 503 and the output apparatus 504 may be interconnected by a bus or in other manners. Interconnections by a bus are taken as an example in FIG. 5.

The input apparatus 503 may receive input numeric or character information and generate key signal inputs related to the processor video memory optimization for deep learning training tasks, for example, a touch screen, a keypad, a mouse, a track pad, a touch pad, a pointing stick, one or more mouse buttons, a track ball, a joystick, or other input devices. The output apparatus 504 may include a display device, auxiliary lighting apparatuses (e.g. LEDs), and tactile feedback apparatuses (e.g. vibrating motors), and the like. The display device may include, but is not limited to, a Liquid Crystal Display (LCD), a Light Emitting Diode (LED) display, and a plasma display. In some implementations, the display device may be a touch screen.

According to an embodiment of the present application, the present application also provides a computer program product including instructions, which when run on an electronic device, cause an electronic device to execute any one of the foregoing implementations.

Various implementations of the systems and techniques described here may be implemented in a digital electronic circuitry, an integrated circuitry, a specific ASIC (application specific integrated circuits), a computer hardware, a firmware, software, and their combinations. These various implementations may include the implementations implemented in one or more computer programs that are executable and/or interpretable on a programmable system including at least one programmable processor. The programmable processor may be special or general, and may receive data and instructions from, and transmit data and instructions to, a storage system, at least one input apparatus, and at least one output apparatus.

These computer programs (also known as programs, software, software applications, or codes) include machine instructions for a programmable processor, and may be implemented using high-level procedures and/or object-oriented language and/or assembly language/machine language. As used herein, the terms "machine-readable medium" and "computer-readable medium" refer to any computer program product, device and/or apparatus (e.g. a magnetic discs, a compact disc, a memory, a Programmable Logic Device (PLD)) configured to provide machine instructions and/or data to the programmable processor, including a machine-readable medium that receives machine instructions as a machine-readable signal. The term "machine-readable signal" refers to any signal configured to provide machine instructions and/or data to the programmable processor.

To provide interaction with a user, the systems and techniques described here can be implemented on a computer. The computer has a display apparatus (e.g. a CRT (cathode ray tube) or an LCD (liquid crystal display) monitor) for displaying information to the user, a keyboard and a pointing apparatus (e.g. a mouse or a trackball). The user may provide input to the computer through the keyboard and the pointing apparatus. Other kinds of apparatuses may also be used to provide interaction with the user. For example, feedback provided to the user may be any form of sensory feedback (e.g. visual feedback, auditory feedback, or tactile feedback). And input from the user may be received in any form, including acoustic input, voice input or tactile input.

The systems and techniques described here may be implemented in a computing system that includes a back-end component (e.g. as a data server), or that includes a middleware component (e.g. an application server), or that includes a front-end component (e.g. a user computer having a graphical user interface or a web browser through which a user may interact with an implementation of the systems and techniques described here), or any combination of such back-end, middleware, or front-end components. The components of the systems may be interconnected by any form or medium of digital data communication (e.g. a communication network). Examples of the communication network include a local area network (LAN), a wide area network (WAN) and the internet.

A computer system may include a client and a server. The client and the server are generally located remotely from each other and typically interact through a communication network. The relationship of client and server arises by virtue of computer programs running on respective computers and having a client-server relationship therebetween.

An embodiment of the present application further provides a processor video memory optimization method for deep learning training tasks, including: determining, by a first processor, a path through which a computing result of a first computing unit is transferred to a second computing unit, where the first computing unit and the second computing unit are included in the first processor, and at least one intermediate computing unit exists between the first computing unit and the second computing unit; and sending, by the first processor, the computing result of the first computing unit to the second computing unit through the path.

In the technical solution according to the embodiment of the present application, the first processor determines the optimal path from the first path and the second path after receiving the request instruction for requesting the training of the deep learning model. In the first path, the computing result of the first computing unit directly reaches the second computing unit from the first computing unit, and in the second path, the computing result of the first computing unit reaches the second computing unit through video memory swaps. Then, the first processor transfers the computing result of the first computing unit to the second computing unit by using the optimal path. By adopting the solution, the optimal path for transferring the computing result is determined. The computing result of the first computing unit is transferred to the second computing unit by using the optimal path. Thus, occupying the video memory is avoided and meanwhile, the problem of low utilization rate of the computing unit of the GPU caused by the video memory swaps is avoided, so that training speed of most tasks is hardly reduced. In addition, in a real training environment, video memory occupancy usually has a peak value along with the numbers of training samples, and usually, only a few samples can reach the peak value. By adopting the solution described in the embodiment of the present application, it is possible to dynamically add the swap operation only for a very small quantity of situations to satisfy requirements of the peak value for the video memory, and training failure caused by storage overflow is avoided. For most non-peak situations, it is not necessary to add the swap operation, and thus overhead caused by the video memory swaps is avoided and the training speed is ensured.

It should be appreciated that, steps may be reordered, added, or deleted according to various processes described above. For example, the steps described in the present application may be executed in parallel, sequentially, or in different orders, which are not limited herein as long as the desired results of the technical solutions disclosed in the present application can be achieved.

The foregoing specific implementations do not constitute a limitation on the protection scope of the present application. A person skilled in the art may appreciate that modifications, combinations, sub-combinations and substitutions may be made according to design requirements and other factors. Any modifications, equivalent substitutions and improvements made within the spirit and principle of the present application should be included in the protection scope of the present application.

What is claimed is:

1. A processor video memory optimization method for deep learning training tasks, comprising:
   receiving, by a first processor, a request instruction input by a user, wherein the request instruction is configured to request training of a deep learning model;
   determining, by the first processor, an optimal path from a first path and a second path, wherein in the first path, a computing result of a first computing unit directly reaches a second computing unit from the first computing unit, and in the second path, the computing result of the first computing unit reaches the second computing unit after a swap operation is executed in a memory of a second processor; wherein the first computing unit and the second computing unit are comprised in the first processor, and at least one intermediate computing unit exists between the first computing unit and the second computing unit, and after the computing result of the first computing unit is sequentially processed by the at least one intermediate computing unit, a computing result of a third computing unit is input to the second computing unit, wherein the third computing unit is a computing unit adjacent to the second computing unit and executed before the second computing unit; and
   transferring, by the first processor, the computing result of the first computing unit to the second computing unit through the optimal path, wherein the computing result of the first computing unit and the computing result of the third computing unit are used for computation corresponding to the second computing unit;
   wherein when the optimal path is the second path, and after the determining, by the first processor, the optimal path from the first path and the second path, the method further comprises:
   determining, by the first processor, the third computing unit from the at least one intermediate computing unit; and
   adding, by the first processor, a dependency relationship between the third computing unit and the swap operation of the second processor.

2. The method according to claim 1, wherein the determining, by the first processor, the optimal path from the first path and the second path comprises:

determining, by the first processor, state information of a video memory of the first processor; and determining, by the first processor, the optimal path from the first path and the second path according to the state information.

3. The method according to claim 2, wherein the state information comprises at least one of the following:

batch size, length of a training sample, size of video memory space occupied by the computing result, swap speed of the video memory, and size of remaining space of the video memory, wherein the batch size is configured to indicate size of training samples loaded to the video memory, and the swap speed of the video memory is configured to indicate an amount of data reaching the memory of the second processor from the video memory per unit time.

4. The method according to claim 1, wherein the swap operation comprises a swap-out operation and a swap-in operation, and after the adding, by the first processor, the dependency relationship between the third computing unit and the swap operation of the second processor, the method further comprises:

executing, by the first processor, a computation corresponding to the first computing unit to obtain the computing result of the first computing unit;

sending, by the first processor, the computing result of the first computing unit to the second processor to cause the second processor to execute the swap-out operation on the computing result of the first computing unit;

determining, by the first processor, whether the computation corresponding to the third computing unit is finished or not, and if the first processor finishes the computation corresponding to the third computing unit, sending indication information to the second processor to cause the second processor to execute the swap-in operation on the computing result of the first computing unit; and executing, by the first processor, the computation corresponding to the second computing unit, according to the computing result of the third computing unit, and the computing result of the first computing unit after the swap-in operation is executed.

5. The method according to claim 1, wherein, after the determining, by the first processor, the optimal path from the first path and the second path, the method further comprises:

determining, by the first processor, whether the computing result of the first computing unit is transferred to the memory of the second processor or not; and releasing space occupied by the computing result of the first computing unit in the video memory, if the computing result of the first computing unit is transferred to the memory of the second processor.

6. The method according to claim 1, wherein the first processor is a tensor processing unit (TPU) or a graphics processing unit (GPU).

7. A processor video memory optimization apparatus for deep learning training tasks, comprising:

at least one processor; and a memory communicatively coupled to the at least one processor, wherein the memory stores instructions executable by the at least one processor, and the instructions are executed by the at least one processor to cause the at least one processor to:

receive a request instruction input by a user, wherein the request instruction is configured to request training of a deep learning model;

determine an optimal path from a first path and a second path, wherein in the first path, a computing result of a first computing unit directly reaches a second computing unit from the first computing unit, and in the second path, the computing result of the first computing unit reaches the second computing unit after a swap operation is executed in a memory of a second processor; wherein the first computing unit and the second computing unit are comprised in the first processor, and at least one intermediate computing unit exists between the first computing unit and the second computing unit, and after the computing result of the first computing unit is sequentially processed by the at least one intermediate computing unit, a computing result of a third computing unit is input to the second computing unit, wherein the third computing unit is a computing unit adjacent to the second computing unit and executed before the second computing unit; and transfer the computing result of the first computing unit to the second computing unit through the optimal path, wherein the computing result of the first computing unit and the computing result of the third computing unit are used for computation corresponding to the second computing unit;

wherein when the optimal path is the second path, and after determining the optimal path from the first path and the second path, the at least one processor is caused to:

determine the third computing unit from the at least one intermediate computing unit; and add a dependency relationship between the third computing unit and the swap operation of the second processor.

8. The apparatus according to claim 7, wherein the at least one processor is caused to:

determine state information of a video memory of the first processor and determine the optimal path from the first path and the second path according to the state information.

9. The apparatus according to claim 8, wherein the state information comprises at least one of the following:

batch size, length of a training sample, size of video memory space occupied by the computing result, swap speed of the video memory, and size of remaining space of the video memory, wherein the batch size is configured to indicate size of training samples loaded to the video memory, and the swap speed of the video memory is configured to indicate an amount of data reaching the memory of the second processor from the video memory per unit time.

10. The apparatus according to claim 7, wherein the swap operation comprises a swap-out operation and a swap-in operation, and after adding the dependency relationship between the third computing unit and the swap operation of the second processor, the at least one processor is caused to:

execute a computation corresponding to the first computing unit to obtain the computing result of the first computing unit; send the computing result of the first computing unit to the second processor to cause the second processor to execute the swap-out operation on the computing result of the first computing unit; determine whether the computation corresponding to the third computing unit is finished or not, and if the first processor finishes the computation corresponding to the third computing unit, send indication information to the second processor to cause the second processor to execute the swap-in operation on the computing result of the first computing unit; and execute the computation corresponding to the second computing unit according to the computing result of the third computing unit and the computing result of the first computing unit after the swap-in operation is executed.

11. The apparatus according to claim 7, wherein, after determining the optimal path from the first path and the second path, the at least one processor is caused to:
   determine whether the computing result of the first computing unit is transferred to the memory of the second processor or not; and release space occupied by the computing result of the first computing unit in the video memory, if the computing result of the first computing unit is transferred to the memory of the second processor.

12. The apparatus according to claim 7, wherein the first processor is a tensor processing unit (TPU) or a graphics processing unit (GPU).

13. A non-transitory computer readable storage medium having computer instructions stored thereon, wherein the computer instructions are configured to cause a computer to execute the method according to claim 1.

* * * * *